United States Patent [19]

Throgmorton

[11] Patent Number: 4,948,705
[45] Date of Patent: Aug. 14, 1990

[54] PHOTOCHROMIC GLASS HIGHLIGHT MASK

[76] Inventor: Norman W. Throgmorton, 3328 Ringer Rd., St. Louis, Mo. 63125

[21] Appl. No.: 294,406

[22] Filed: Jan. 9, 1989

Related U.S. Application Data

[63] Continuation-in-part of Ser. No. 15,279, Feb. 17, 1987, abandoned.

[51] Int. Cl.$^5$ .......................... G03F 1/00; G03C 5/04
[52] U.S. Cl. ...................................... 430/292; 430/4; 430/396; 430/962
[58] Field of Search .................. 430/5, 6, 7, 293, 394, 430/292, 396, 397, 962, 4

[56] References Cited

U.S. PATENT DOCUMENTS

| | | | |
|---|---|---|---|
| 3,680,956 | 8/1972 | Custer | 355/71 |
| 4,608,349 | 8/1986 | Kerko et al. | 501/13 |
| 4,758,502 | 7/1988 | Banks | 430/394 |

OTHER PUBLICATIONS

"Corning Photochromic Ophthalmic Lenses," Corning Glass Works, bulletin #OPO-181, 1985.

*Primary Examiner*—Jose Dees
*Attorney, Agent, or Firm*—Jerome A. Gross

[57] ABSTRACT

A highlight mask, especially suited for printing from positive color transparencies, is made of photochromic glass which, like Corning PHOTOGRAY EXTRA sunglass lens material, darkens not only under ultraviolet radiation but also under visible radiation in the blue range. The mask is made by mounting, onto its upper surface, a photo transparency and exposing it to flashes of intense light strong in the blue range. Such radiation penetrates the thin or highlight areas of a photo transparency, regardless of their color tint, and creates a negtive highlight-masking image in the glass. While it does not effect general contrast reduction over the entire film area, the highlight masking image requires no further development, remains in registration with the transparency for photoprinting, and fades in time or when heated, so that the glass may be reused.

8 Claims, 2 Drawing Sheets

PHOTOCHROMIC GLASS HIGHLIGHT MASK

CROSS-REFERENCE TO RELATED APPLICATIONS

This invention is a continuation-in-part of application Ser. No. 07/015,279, filed Feb. 17, 1987, entitled "REUSABLE HIGHLIGHT MASK AND CARRIER", now abandoned.

BACKGROUND OF THE INVENTION

1. Field of Invention

This invention provides a photochromic glass highlight mask and carrier especially useful in photo-enlarging positive color transparencies, using photochromic glass which darkens only under blue and shorter wavelengths of radiation.

2. Description of the Related Art

Photographic transparencies, including positive color transparencies, may incorporate a far broader range of contrast than is feasible for photoprinting. Highlight areas (those of greatest transparency) are particularly difficult; and control or "holding back" of highlights by highlight masks is a useful technique. A related but more comprehensive technique is contrast reduction—masking to lessen contrast not merely in the highlight or thin areas of the transparency, but instead to lessen contrast over the print area. For this related purpose, black-and-white film masks are customarily used; however attempts have been made to use photochromic glass, as hereinafter referred to.

Masks made from black-and-white film effect general contrast reduction over the entire area of the transparency. In making these, a photo transparency to be printed (whether positive or negative, color or black and white) is first placed above and in contact with a photosensitive black-and-white film; and an exposure is made.

Disadvantages of this practice include: Making such a negative film mask requires removal to a dark room, developing, and drying for roughly two hours at room temperature, because drying under heat would shrink the film. Should the mask density be too little or too great, this procedure must be repeated. After drying, the mask must be assembled between the enlarger carrier glasses in precise registration with the transparency to be printed; even using pins for alignment, perfect registration is hardly possible.

Efforts heretofore made, to make such general contrast-reduction masks using photochromic glass, are believed to have been unsuccessful. Since earlier photochromic glass responded substantially only to ultraviolet radiation, one effort, shown in U.S. Pat. No. 3,680,956 to Custer, requires that (a) only ultraviolet light be used both for making such a mask, (b) in using the mask in photoprinting, only ultraviolet light be projected; and (c) since ordinary glass will filter out most ultraviolet radiation, only quartz glass be used for all glass elements in the enlarger.

Another effort to make general contrast-reduction masks of photochromic glass, is set forth in the recently issued patent to Banks, U.S. Pat. No. 4,758,502 dated July 19, 1988. Banks may have intended such contrast reduction only for black-and-white photographs; he states incorrectly (Col. 7, starting with line 10): "It is in the nature of the brightest parts of a photograph to be fairly white and the darkest parts to be fairly black, so the contrast mask will form properly for these areas with little regard for the colour sensitivity of photochromic body, The color range in its sensitivity is important only in the areas of medium optical density . . . " Whatever this may mean, it makes clear that his purpose was not to mask only the highlights.

Banks specifies, for making his mask, a "multiple wavelength white light" which is to have "a colour temperature of at least 4000 K. more preferably at least 5000 K." He requires that the photochromic glass must darken in response to "the majority of wavelengths in the visible spectrum" and not fade in response to any visible radiation. To the best of the present inventor's knowledge, no photochromic glass known in the United States has such response and and non-fading characteristics. Banks suggests that certain experimental glass has been made in the United Kingdom which will meet his criteria, provided that the mask be made in a cold room at a different location than the enlarger; and that even the enlarger must operate at a temperature not to exceed 70 degrees F. Air-cooled enlargers now in professional use operate at temperatures in the range of 80-90 degrees F. For all these reasons the Banks' teachings do not appear to be practicable.

SUMMARY OF THE INVENTION

In contrast to these prior efforts, the present invention, which I developed primarily for use in highlight masking of positive color transparencies, anomalously requires no broadly color-responsive photochromic glass. My process:

1. Uses commercially available photochromic sunglass-lens glass which darkens in response only to ultraviolet and near-ultraviolet (that is, blue) radiation, and not to radiation of greater wavelengths (yellow or red); and which clears when exposed to red radiation. My original application, of which this is a continuation-in-part, described its response as being "to light rays, usually at the ultraviolet end of the spectrum."

2. Activates such response best under strongly blue, high Kelvin temperature light. This passes through the thin highlight areas of a positive color transparency regardless of their tint, to react the blue-responsive glass.

While such light will also contain ultraviolet radiation to which the photochromic glass would respond, this will be substantially filtered out by the carrier cover glass and the film material of the transparency; and what little may pass through such thin transparency areas will merely add density to the masking image.

DESCRIPTION OF THE PREFERRED EMBODIMENT

Figure 1:
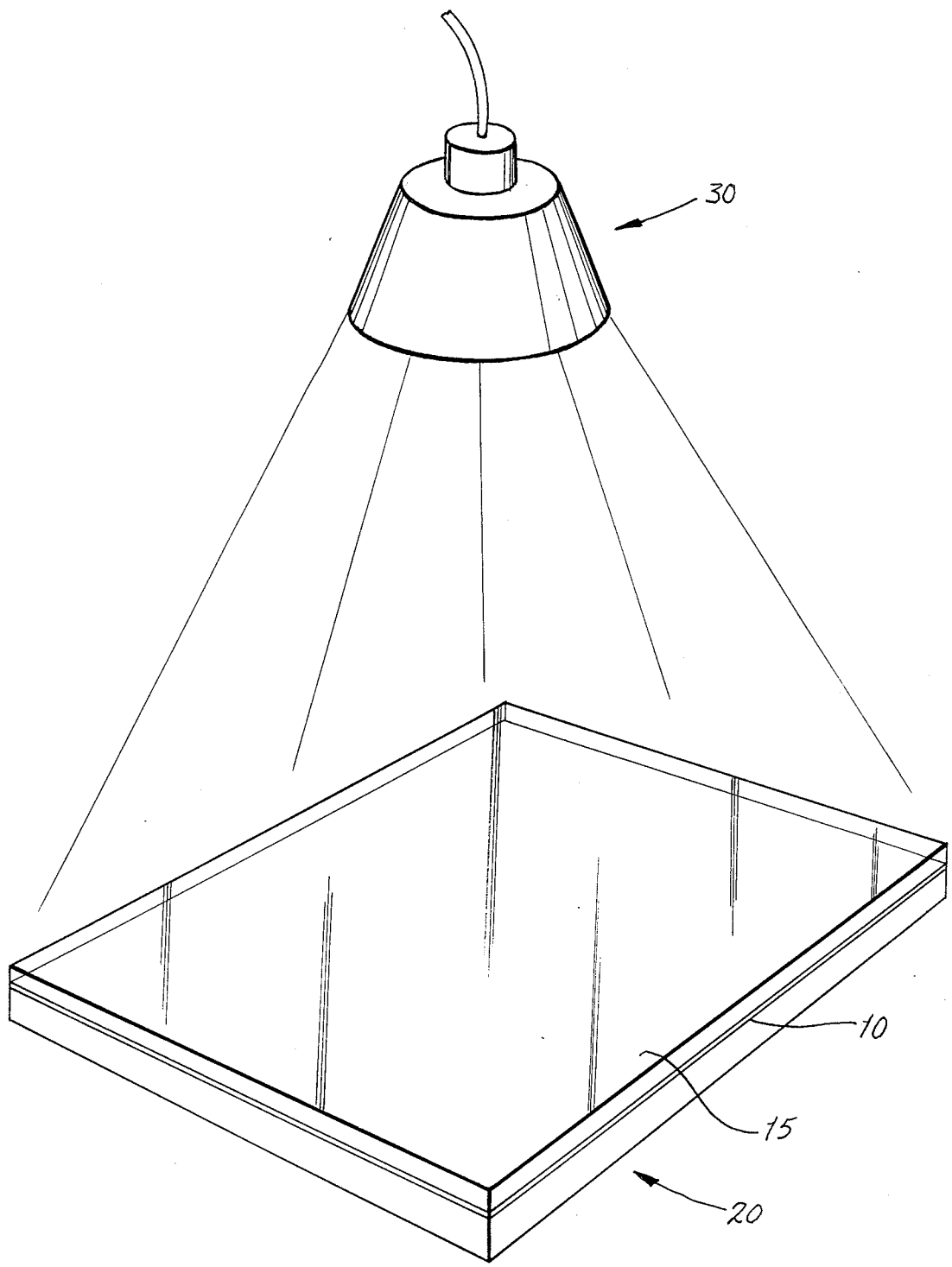
FIG. 1 shows in perspective the photochromic glass highlight mask of the present invention, assembled with a transparency and a conventional upper carrier glass, together being exposed to a photoflash lamp shown schematically.

In evolving my invention I first reasoned that, even for highlight masking of color transparencies, a range of color-responsiveness of a photochromic glass is not necessary; what is required was that it should darken at some wavelengths higher than ultraviolet. The glass formulated by Corning Glass Works, Corning, N.Y., under U.S. Pat. No. 4,608,349 meets these criteria; it is commercially available under its trademark "PHOTO-GRAY EXTRA." My experiments verified my concept that to mask thinly pigmented color areas, the color of the mask-making light, which must penetrate the transparency and darken the photochromic glass, is important only in that it be strong in wavelengths which will activate the response of the photochromic glass, and not in wavelengths which will fade it.

The light used for making the mask should be rich in blue radiation; it should advantageously have a color temperature of 8,000 K. or higher, preferably 12,000 K. In practicing the process of the invention, I have found that when lamps of a temperature of 5,000 K. or less are used, the heat of the redder rays tends to fade the glass, thus offsetting the darkening effect of the more blue rays of the light. Such offsetting by the red rays cannot be overcome by increasing the wattage applied, nor by holding the masking light closer.

The PHOTOGRAY EXTRA glass, as formulated for sunglass use, darkens strongly in response to radiation in the extreme lower portion of the visible range (considered as beginning at about 380 or 400 nanometers) up to about 440 nanometers; above this wavelength its response drops off sharply, to negligible at and above 500 nanometers. From the red range at about 700 nanometers and to the upper limit of the visible range at about 780 nanometers, the photochromic effect is reversed; and previously darkened glass is faded.

Using the presently disclosed photochromic glass, a thickness of two millimeters may contain sufficient reactive silver halides to make an adequately dense highlight mask, although for general purposes a thickness of four millimeters will be found preferable. Thicknesses of from one to seven millimeters may be desirable for some usages.

A necessary quality for the glass is that it should not fade operating temperatures, which for practical purposes must be ordinary room temperatures. For this purpose, the glass chosen is of the silica type, rather than the type formulated with phosphate. All photochromic glass fades at higher temperatures; but the silica type fades little at temperatures below 100 degrees F. if not subjected to red radiation. This choice avoids the requirements of Banks that his contrast-reducing mask be made in a cold room and be used at temperatures below normal operating temperatures of enlargers.

Referring to the drawings, a transparency generally designated 10, which may either be color or black and white, positive or negative, includes a highlight portion 12, shown schematically. In the assembled view FIG. 1, the transparency 10 is shown sandwiched beneath a conventional glass upper transparency carrier element 15 and the new highlight mask generally designated 20, which also serves as the lower carrier element.

The element 20 is formed preferably of the PHOTO-GRAY EXTRA or similar silica-type photochromic glass, which responds not merely to ultraviolet light, but also very substantially to light in the visible blue range, that is, from the near ultraviolet radiation starting at 380 or 400 nanometers to the "welder's blue" at about 440 nanometers. At wavelengths above this point its photochromic response drops off sharply, ceasing at about 500 nanometers. At wavelengths longer than say 700 nanometers to the end of the visible spectrum at say 760 to 800 nanometers (that is, red) even previously darkened portions will fade at room temperature.

The silver halide microcrystals which are distributed substantially uniformly throughout the photochromic glass element 20 react to the light as follows: On exposure to radiation of relatively high Kelvin temperature (that is, strongly blue as well as ultraviolet) these microcrystals disassociated into free silver particles which cluster to form silver colloids, darkening the glass. When no longer subject to such activation, in time or with heat or red radiation, the silver colloids split apart into free silver particles which regroup with the trapped halides and reform silver halide microcrystals. This process is known to be completely and indefinitely reversible.

The element 20 has upper and lower surfaces 21, 22 which are planar, and polished and ground to parallelism at a thickness preferably in the range of two to four millimeters, but in any event between one and seven millimeters. I have found the thickness of four millimeters to be especially convenient where a darkening of highlight areas to a density of 0.30 (as measured by a standard densitometer) is desired. However, using a flash whose color temperature is about 12,000 K., a contrast mask may readily be made using the PHOTO-GRAY EXTRA material of a thickness of two millimeters. It will be apparent that a still thinner mask, say one millimeter, will contain less silver halides; yet it may be satisfactory for some uses.

Figure 2:
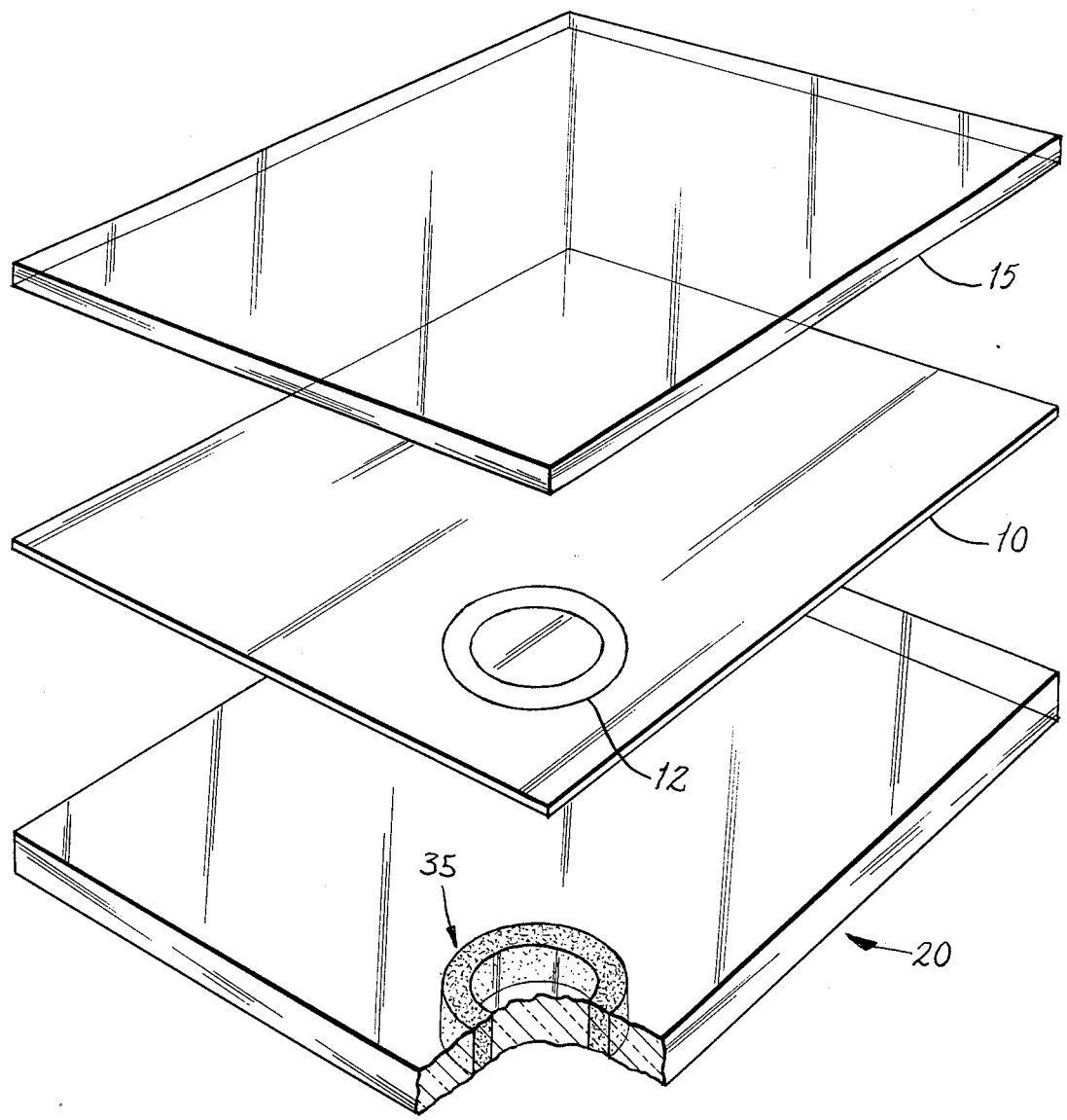
FIG. 2 is a partly fragmentary view of the elements of FIG. 1 showing schematically a masking image formed in the photochromic glass.

In using the new element 20, an upper carrier glass 15, transparency 10 and carrier element 20 are assembled as shown in FIG. 1, and may be taped together at their edges or clamped in a conventional carrier holding means, not shown. They are then exposed to a high intensity light, preferably a flash lamp. Originally, I used a 500 watt-second flash lamp, illustrated schematically in FIG. 2 and generally designated 30, positioned four inches from the assembly; this flash had been equipped with a modeling lamp and emitted light of 5,000 Kelvin color temperature. Such a conventional strobe light would be intensely blue unless its color temperature is reduced by the interposition of a yellow filter or a modeling lamp, as conventionally included, which reduces the color temperature to the supposed daylight color of 5,000 to 5,500 K. My original work was at this color temperature, which is much bluer than other conventional types of light; for example, the light from incandescent bulbs has the color temperature of about 2,800 K., while that from halogen lamps is about 3,200 K. These latter light sources contain far too much red radiation to be useful for my present process. For better reliability than I originally obtained, I remove the yellow filter or modeling lamp from the conventional daylight strobe light, increasing its color temperature from the daylight blue to a much more intense blue of between 8,000 and 12,000 K.

The density of the transparency with mask may be ascertained when the assembled elements are positioned in conventional photoprinting apparatus; it is then measured with a conventional densitometer. Assuming that the desired mask density has been achieved, the photoprinting proceeds immediately. If the masking image is not sufficiently dense, the assembled transparency 10 with the upper and lower elements 15 and 20 is removed from the apparatus and again subjected to bursts of light from the photoflash lamp 30, and a new densitometer measurement is made. On the other hand, if the mask density is too great, it will fade to a lesser density in a relatively short period of time; hence by merely waiting and after remeasuring the density, the printing exposure may be made.

Should it be desired to make a succession of like prints from the same transparency, I leave the enlarger light on the greater part of the time between successive exposures, extinguishing it only when it would affect photosensitive materials there present. Though an enlarger light is not strong enough to darken the masking image in the photochromic glass, nevertheless it tends to maintain its density satisfactorily, avoiding fading with time.

Referring again to FIG. 2, the masking image generally designated 35, which is formed in registration to the highlight 12 in the transparency 10, is made up of the clustered silver colloids 36, illustrated schematically, which extend throughout the thickness of the photochromic element 20 but are somewhat more dense near its upper surface. Their dispersion contrasts the graininess of a conventional black-and-white film mask. The glass itself serves to diffuse the image edges; this eliminates the need for a special diffuser layer which is required when using a film mask if the highlights are sharp-edged. Taking into account the added two surfaces of such a diffuser layer and the two surfaces of a film mask, the present combined mask and carrier element eliminates the need for maintaining such four surfaces dust-free. This factor, taken together with eliminating the problem of registration, brings about a higher quality of photoprinting with masks than has been achievable in the past, while the freedom from grain extends the feasible enlargement size.

The economic advantages of the present invention over using a film highlight mask are manifest. The time required for making the present photochromic glass masking element, as compared with film masks, is reduced from approximately two hours to less than a minute. The problem of effecting registration is completely eliminated. Inasmuch as the photochromic element 20 may be cleared at once by immersion in warm water or in a stream of warm air and is infinitely reusable, the new process is both highly convenient and economical.

In the foregoing description the new combined mask and carrier element 20 is sometimes referred to as the lower carrier element, and the conventional glass element 15 as the upper carrier element. The photochromic element 20 and the upper carrier glass 15 may be of any size and shape adapted to fit the photoreproduction apparatus used, whether an enlarger or otherwise.

The term transparency as here used includes both positive and negative images, color or black and white, including those not made by photographic processes; except that the present material and process will not work with popular color negative film having a dense orange base. The term "highlight" as here used refers to thin relatively unpigmented areas in the transparency; when the transparency is a positive, on printing detail will be brought out in light areas of the print; whereas if the transparency is a negative, detail will be brought out in otherwise dark or dense areas.

The principal immediate commercial usage of the present invention is believed to be in the field of making enlargements from positive photo transparencies.

As various modifications may be made in the device and method herein described and illustrated, without departing from the scope of the invention, it is intended that the description and drawings shall be interpreted as illustrative rather than limiting.

I claim:

1. The new use, namely as highlight mask for photoreproduction of transparencies having highlight areas, of photochromic sunglass lens material so constituted that radiation in the blue visible range, as well as in the ultraviolet range, will darken the glass, and red radiation will fade it to clear, comprising the steps of providing such material with opposed parallel surfaces defining a thickness of between one and seven millimeters, securing a film transparency to one of said surfaces, and transmitting light consisting essentially of light in the blue visible range, along with substantially less or no red radiation, through the highlight area of such transparency into said photochromic glass, whereby darkened microcrystals formed in reaction to such light will form a grainless highlight-mask extending throughout the thickness of the photochromic glass and already secured in registration with such transparency for subsequent photoprinting.

2. The process as defined in claim 1, wherein the thickness of said glass is preferably between two and four millimeters.

3. The process as defined in claim 1, wherein the step of transmitting such light through such transparency into the photochromic glass is accomplished by flashes of such light continued until a masking image is formed of a density of substantially 0.30 as measured by a conventional densitometer, or if a more dense image is formed, permitting it to fade to substantially such density before photoprinting.

4. The process as defined in claim 1, wherein the step of transmitting such light includes transmitting light having a color temperature of 8,000 K. or greater.

5. The process as defined in claim 1, wherein the step of transmitting such light includes transmitting light having a color temperature of substantially 12,000 K.

6. The process of making and using a highlight mask for enlarged photoprinting of color transparencies on photosensitive material, comprising the process of making such mask as defined in claim 5, together with the subsequent steps of presenting such mask with such a transparency secured thereon for printing at room temperature in a photo enlarging apparatus whose light source radiates a balance of all colors of the visible spectrum, and exposing such transparency and mask for transmission of light from such light source through the transparency and mask onto such photosensitive material, whereby the mask holds back a portion of light through the highlight areas of the transparency as the photoprinting is carried on, so as to improve the contrast in said highlight areas as printed, and the blue light of said color balance offsets the tendency of the red light thereof to fade the mask.

7. The process of making and using a highlight mask for enlarged photoprinting of color transparencies on photosensitive material, comprising the steps at room temperature of mounting such transparency overlaid by a non-quartz cover glass onto a sheet element of photochromic glass of the silica type which darkens at room temperature under radiation from the ultraviolet range up to and including the blue range but which fades under radiation in the red range, and flashing through such cover glass, transparency and photochromic glass, light which consist essentially of light in the blue range, whereby the glass and transparency substantially filter out ultraviolet radiation from such mask-making light, and the blue radiation therefrom penetrates the highlight areas of such positive transparency regardless of their color tint and forms a darkened highlight masking image in said glass, presenting such mask with such a transparency secured thereon for printing at room temperature in a photo enlarging apparatus whose light source radiates a balance of all colors of the visible spectrum, and exposing such transparency and mask for transmission of light from such light source through the transparency and mask onto such photosensitive material, whereby the mask holds back a portion of light through the highlight areas of the transparency as the photoprinting is carried on, so as to improve the contrast in said highlight areas as printed, and the blue light of such color balance off-sets the tendency of the red light thereof to fade the mask.

8. The process of making a highlight mask for positive color transparencies, comprising the steps at room temperature of mounting such transparency overlaid by a cover non-quartz glass onto a sheet element of photochromic glass of the silica type which darkens at room temperature under radiation from the ultraviolet range up to and including the blue range but which fades under radiation in the red range, and flashing through such cover glass, transparency and photochromic glass, light which consist essentially of light in the blue range, whereby the glass and transparency substantially filter out ultraviolet radiation from such mask-making light, and the blue radiation therefrom penetrates the highlight areas of such positive transparency regardless of their color tint and forms a darkened highlight masking image in said glass.

* * * * *

UNITED STATES PATENT AND TRADEMARK OFFICE
CERTIFICATE OF CORRECTION

PATENT NO. : 4,948,705

DATED : August 14, 1990

INVENTOR(S) : Norman W. Throgmorton

It is certified that error appears in the above-identified patent and that said Letters Patent is hereby corrected as shown below:

ON TITLE PAGE:

In the Abstract, line 11, delete "negtive" and substitute ---negative---.

In Column 6, line 45, delete "5" and substitute ---8---.

Signed and Sealed this

Third Day of December, 1991

Attest:

HARRY F. MANBECK, JR.

*Attesting Officer*  *Commissioner of Patents and Trademarks*